United States Patent
Ito

(10) Patent No.: US 11,526,208 B2
(45) Date of Patent: Dec. 13, 2022

(54) ELECTRONIC DEVICE AND METHOD FOR CONTROLLING ELECTRONIC DEVICE

(71) Applicant: CANON KABUSHIKI KAISHA, Tokyo (JP)

(72) Inventor: Junji Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 17/191,245

(22) Filed: Mar. 3, 2021

(65) Prior Publication Data
US 2021/0278749 A1  Sep. 9, 2021

(30) Foreign Application Priority Data

Mar. 6, 2020  (JP) .............................. JP2020-039169

(51) Int. Cl.
*G06F 3/01* (2006.01)
*H04N 13/383* (2018.01)
*H04N 5/232* (2006.01)
*G03B 13/36* (2021.01)

(52) U.S. Cl.
CPC ............. *G06F 3/013* (2013.01); *G03B 13/36* (2013.01); *H04N 5/232127* (2018.08); *H04N 13/383* (2018.05); *G03B 2213/025* (2013.01)

(58) Field of Classification Search
CPC .. G03B 13/36; G03B 2213/025; G03B 13/02; G06F 3/013; H04N 5/232127; H04N 5/232933
See application file for complete search history.

(56) References Cited

U.S. PATENT DOCUMENTS

| | | | |
|---|---|---|---|
| 7,956,845 B2 | 6/2011 | Lee | |
| 10,001,837 B2* | 6/2018 | Anderson | G06F 3/013 |
| 2016/0162727 A1* | 6/2016 | Hu | G06F 3/013 382/103 |
| 2017/0160799 A1* | 6/2017 | Shi | G06F 3/0484 |
| 2018/0018514 A1* | 1/2018 | Azam | G06V 40/197 |
| 2018/0070093 A1* | 3/2018 | Shin | H04L 65/00 |
| 2020/0218341 A1* | 7/2020 | Young | G08B 6/00 |

FOREIGN PATENT DOCUMENTS

| | | |
|---|---|---|
| JP | H04335607 A | 11/1992 |
| JP | 2005141731 A | 6/2005 |

* cited by examiner

*Primary Examiner* — Abdelaaziz Tissire
(74) *Attorney, Agent, or Firm* — Rossi, Kimms & McDowell LLP

(57) ABSTRACT

An electronic device comprising a control unit performs control such that despite a predetermined trigger issued before a duration of a gaze state according to a line-of-sight input relative to a first region, in which the display item is displayed, reaches a first time, neither a first function nor a second function is performed, in response to the predetermined trigger issued in a state where the duration of the gaze state relative to the first region is at least the first time and less than a second time, a part of a display object based on an input position of the line-of-sight input is selected and the first function is performed, and in response to the predetermined trigger issued in a state where the duration is at least the second time, the display item is selected and the second function is performed.

19 Claims, 6 Drawing Sheets

ELECTRONIC DEVICE AND METHOD FOR CONTROLLING ELECTRONIC DEVICE

BACKGROUND OF THE INVENTION

Field of the Invention

The present invention relates to an electronic device and a method for controlling the electronic device.

Description of the Related Art

Conventionally, an electronic device that selects a region by using a line-of-sight input is known. Japanese Patent Application Publication No. H04-335607 proposes a method of selecting a tracking target as an autofocus (AF) target by using a line-of-sight input. More specifically, to prevent an AF/AE area from being changed by fine movements of the line-of-sight (fixational eye movements) occurring while a user gazes at a subject, an optical device is proposed that determines a viewed position (viewed point) depending on whether an amount of change in the viewed position exceeds a reference value of the fixational eye movements of an eyeball.

Meanwhile, Japanese Patent Application Publication No. 2005-141731 proposes a touch-screen display device that, when a region where indications showing two functions superimposed over each other is touched, performs a function of an upper layer if the duration during which the region is touched is less than a predetermined time and performs the function of a lower layer if the duration is at least the predetermined time.

However, in the technique disclosed in Japanese Patent Application Publication No. H04-335607, when a selectable object is superimposed on the subject, the device can perform only one of the selection of the subject that is to be tracked in the position where the selectable object is superimposed, and the function conforming to the selectable object.

The technique of Japanese Patent Application Publication No. 2005-141731 performs, in response to a touch operation by a user, one of the selection of the object displayed in the upper layer and the selection of the object displayed in the lower layer. However, if an operation is performed by means of a line-of-sight, since a user naturally looks at these positions even if the user has no intention of performing any operation, the function relating to the position of the line-of-sight input is performed even if the user does not intend to give an instruction relating to the position the user is looking at.

SUMMARY OF THE INVENTION

An object of the present invention is to provide an electronic device that enables a function desired by a user to be performed by means of a line-of-sight of the user even when selectable objects are displayed superimposed over each other.

An aspect of the present invention is : an electronic device comprising at least one memory and at least one processor which function as: a receiving unit configured to receive a line-of-sight input corresponding to a line-of-sight of a user who looks at a display; a display control unit configured to perform control to display on the display a display object and display a display item superimposed on the display object; and a control unit configured to perform control such that 1) in a case where a predetermined trigger issued before a duration of a gaze state according to the line-of-sight input relative to a first region, in which the display item is displayed, reaches a first time, neither a first function nor a second function is performed, 2) in a case where the predetermined trigger issued in a state where the duration of the gaze state relative to the first region is at least the first time and less than a second time, a part of the display object based on an input position of the line-of-sight input is selected and the first function is performed, and 3) in a case where the predetermined trigger issued in a state where the duration of the gaze state relative to the first region is at least the second time, the display item is selected and the second function is performed.

Further features of the present invention will become apparent from the following description of exemplary embodiments with reference to the attached drawings.

DESCRIPTION OF THE EMBODIMENTS

External View of Digital Camera 100

Figure 1A:
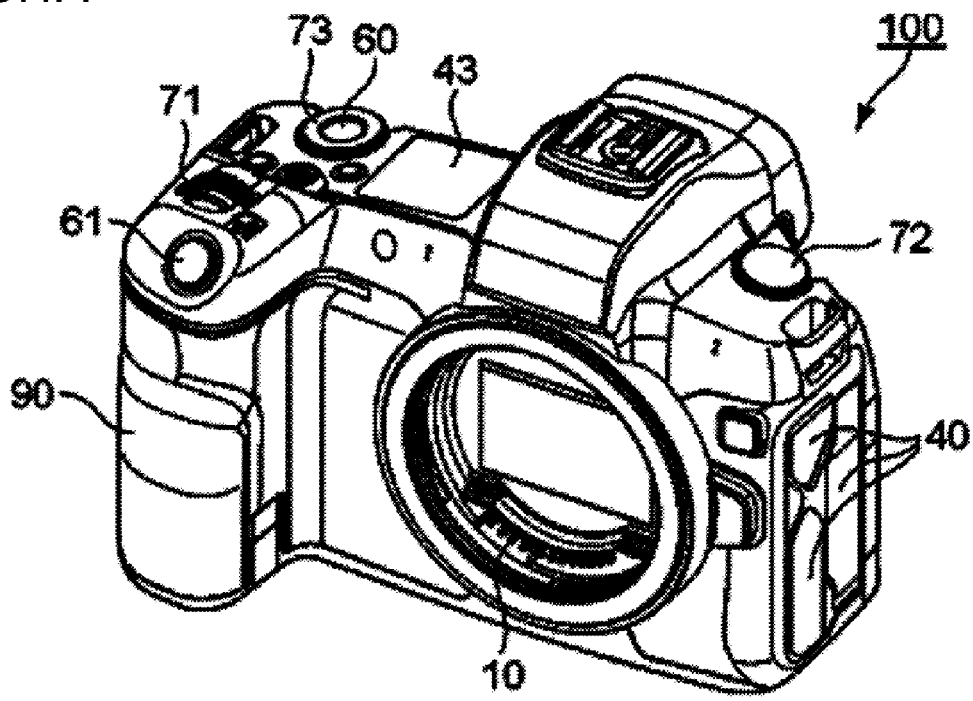
FIGS. 1A and 1B are external views of a digital camera.
Figure 1B:
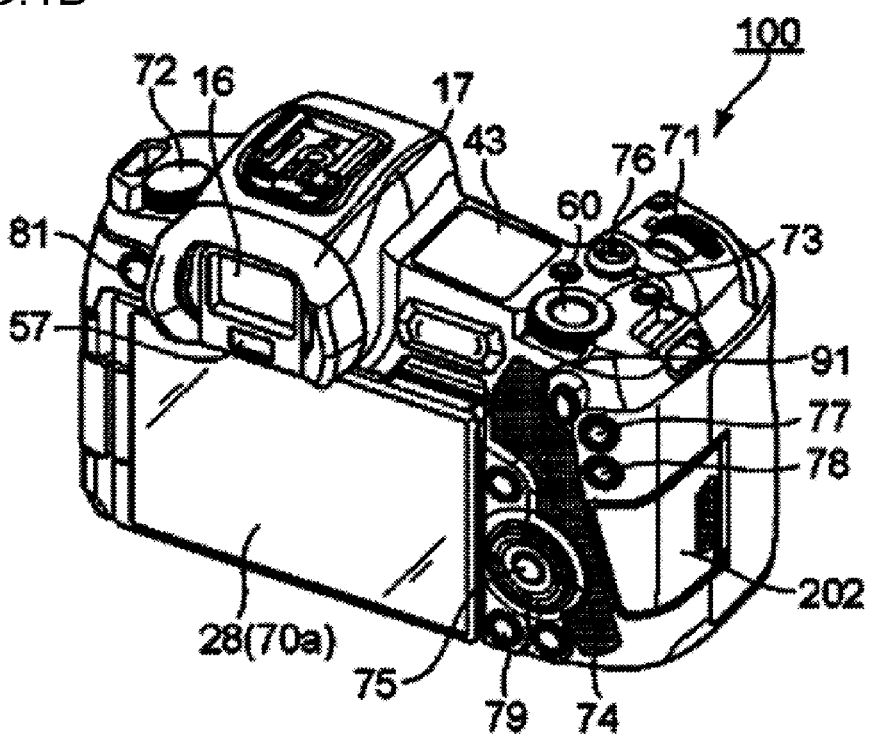

Preferred embodiments according to the present invention are now described with reference to the drawings. FIGS. 1A and 1B are external views of a digital camera 100 as an example of a device to which the present invention is applicable. FIG. 1A is a front perspective view of the digital camera 100, and FIG. 1B is a back perspective view of the digital camera 100.

A display unit 28 is provided on the back side of the digital camera 100 and displays images and various types of information. A touch panel 70a can detect a touch operation on the display surface (touch operation surface) of the display unit 28. An out-of-finder display unit 43 is provided on the upper side of the digital camera 100 and displays various setting values of the digital camera 100, such as a shutter speed and a diaphragm aperture. A shutter button 61 is an operation member for instructing the capturing of images. A mode changeover switch 60 is an operation member for switching between various modes. Terminal covers 40 protect connectors (not shown) that connect the digital camera 100 to external devices.

An electronic main dial 71 is a rotational operation member that is rotated to change setting values, such as a shutter speed and a diaphragm aperture. A power switch 72 is an operation member that switches the power of the digital camera 100 on and off. An electronic sub-dial 73 is a rotational operation member that is rotated to perform operations such as moving a selection frame (cursor) and image feeding. A four-way key 74 includes upper, lower, left, and right portions that can be individually pressed to enable a process associated with the pressed portion of the four-way key 74. A SET button 75 is a push-button mainly used to set a selected item.

A moving-image button 76 is used to instruct to start or stop capturing (recording) of a moving image. An AE lock button 77 is a push button. Pressing the AE lock button 77 in an image-capturing standby state fixes the exposure state.

An enlargement button 78 is an operation button for switching an enlargement mode on and off in a live view display (LV display) in an image-capturing mode. By operating the electronic main dial 71 after switching on the enlargement mode, a live view image (LV image) can be enlarged or reduced. In a playback mode, the enlargement button 78 functions as an operation button for enlarging a playback image or increasing the enlargement ratio of the playback image. A playback button 79 is an operation button for switching between the image-capturing mode and the playback mode. Pressing the playback button 79 in the image-capturing mode transitions the mode to the playback mode and displays the latest image among the images stored in a recording medium 200 (described below) on the display unit 28. A menu button 81 is a push-button used for an instruction operation for displaying a menu screen. Pressing the menu button 81 displays on the display unit 28 the menu screen with which various settings can be performed. A user can intuitively perform various settings with the menu screen displayed on the display unit 28, the four-way key 74, and the SET button 75.

A communication terminal 10 is used by the digital camera 100 to communicate with a lens unit 150, which is attachable and detachable and described below. An eyepiece 16 is an eyepiece of an eyepiece finder (a look-in finder), and the user can visually check, via the eyepiece 16, an image displayed on an internal EVF 29 (described below). An eye-proximity detecting unit 57 is an eye-proximity detecting sensor that detects whether an eye of a user (photographer) is positioned at the eyepiece 16. A lid 202 is a lid of a slot in which the recording medium 200 (described below) is stored. The grip unit 90 is a holding portion shaped to be readily gripped by the right hand of the user to hold the digital camera 100. The shutter button 61 and the electronic main dial 71 are arranged at positions that are operable with the index finger of the right hand in a state of holding the digital camera 100 with the little finger, ring finger, and middle finger of the right hand gripping the grip unit 90. Additionally, the electronic sub-dial 73 is arranged at a position that is operable with the thumb of the right hand in the same state. A thumb rest unit 91 (a thumb standby position) is a grip member provided at a position on the back side of the digital camera 100 where the thumb of the right hand gripping the grip unit 90 can be readily placed while the right hand is not operating any operation members. The thumb rest unit 91 may be formed by a rubber member to enhance the holding force (grip feeling).

Configuration Block Diagram of Digital Camera 100

Figure 2:
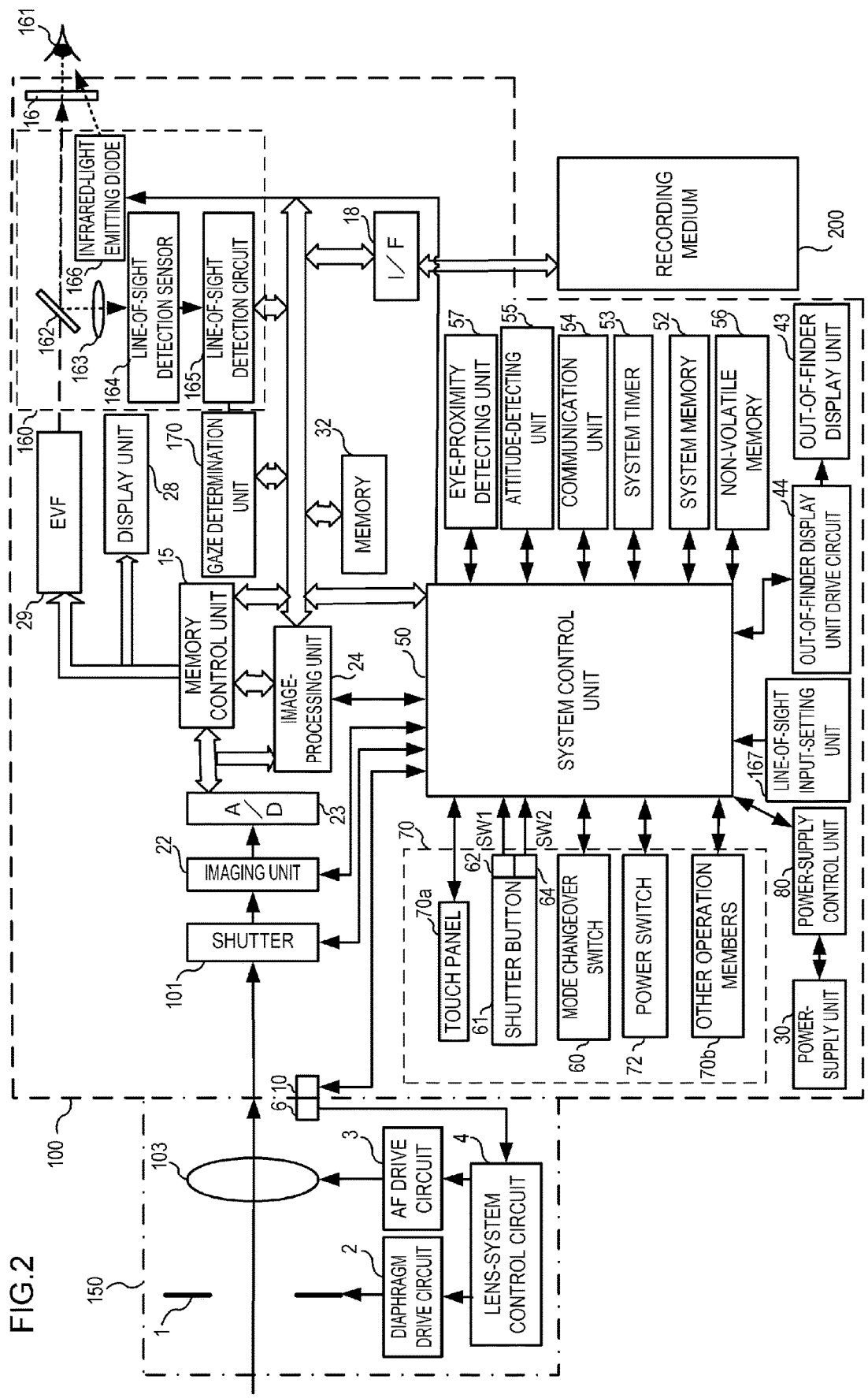
FIG. 2 is a diagram illustrating the configuration of the digital camera.

FIG. 2 is a block diagram showing a configuration example of the digital camera 100. The lens unit 150 includes replaceable photographing lenses. Lenses 103 usually consist of a plurality of lenses, but FIG. 2 simply shows only one lens. A communication terminal 6 is used by the lens unit 150 to communicate with the digital camera 100, and a communication terminal 10 is used by the digital camera 100 to communicate with the lens unit 150. The lens unit 150 communicates with a system control unit 50 via these communication terminals 6 and 10. The lens unit 150 includes a lens-system control circuit 4, which controls a diaphragm 1 via a diaphragm drive circuit 2. The lens-system control circuit 4 of the lens unit 150 also changes the position of the lens 103 via an AF drive circuit 3 for focusing.

A shutter 101 is a focal-plane shutter that can freely control the exposure time of an imaging unit 22 under the control of the system control unit 50.

The imaging unit 22 is an imaging element, which may be a CCD or a CMOS, for converting an optical image into an electric signal. The imaging unit 22 may have an imaging-surface phase-difference sensor that outputs information on a defocusing amount to the system control unit 50.

An image-processing unit 24 performs predetermined processes (e.g., pixel interpolation, resizing such as reduction, and color conversion) on data received from an A/D converter 23 or data received from a memory control unit 15. The image-processing unit 24 also performs a predetermined calculation process using the captured image data, and the system control unit 50 performs exposure control and distance measurement control based on the calculation result obtained by the image-processing unit 24. This allows for processing such as through-the-lens (TTL) autofocus (AF) processing, autoexposure (AE) processing, and pre-flashing (EF) processing. The image-processing unit 24 further performs a predetermined calculation process using the captured image data, and performs TTL auto white balance (AWB) processing based on the obtained calculation result.

The memory control unit 15 controls data transmission and reception between the A/D converter 23, the image-processing unit 24, and the memory 32. The output data from the A/D converter 23 is written into a memory 32 via the image-processing unit 24 and the memory control unit 15. Alternatively, the output data from the A/D converter 23 is written into the memory 32 via the memory control unit 15 without going through the image-processing unit 24. The memory 32 stores the image data that is obtained by the imaging unit 22 and converted into digital data by the A/D converter 23, and the image data to be displayed on the display unit 28 and the EVF 29. The memory 32 has a storage capacity sufficient to store a predetermined number of still images, and moving images and audio of predetermined durations.

The memory 32 also serves as a memory for displaying images (video memory). The image data for display written in the memory 32 is displayed on the display unit 28 and the EVF 29 via the memory control unit 15. Each of the display unit 28 and the EVF 29 displays images according to the signal received from the memory control unit 15 on a display device such as an LCD or an organic EL. The data that have been subjected to A/D conversion by the A/D converter 23 and accumulated in the memory 32 are sequentially transferred to the display unit 28 or the EVF 29 to be displayed, thereby achieving live view (LV) display. Hereinafter, an image displayed in the live view display is referred to as a live view image (LV image).

A line-of-sight detection unit 160 detects a line-of-sight of a user at the eyepiece 16. The line-of-sight detection unit 160 includes a dichroic mirror 162, an image-forming lens 163, a line-of-sight detection sensor 164, a line-of-sight detection circuit 165, and an infrared-light emitting diode 166. The system control unit 50 can perform a predetermined process in response to a detection of a line-of-sight. As such, the line-of-sight detection unit 160 can be considered as a part of the operation unit 70.

The infrared-light emitting diode 166 is a light-emitting element for detecting a viewed position (viewed point) of the user on the finder screen, and irradiates the user's eyeball (eye) 161 with infrared light. The infrared light emitted from the infrared-light emitting diode 166 is reflected on the eyeball (eye) 161, and the reflected infrared light reaches the dichroic mirror 162. The dichroic mirror 162 reflects only infrared light and transmits visible light. The reflected infrared light whose optical path has been changed is imaged on the imaging surface of the line-of-sight detection sensor 164 via the image-forming lens 163. The image-forming lens 163 is an optical member that constitutes a line-of-sight detection optical system. The line-of-sight detection sensor 164 includes an imaging device such as a CCD image sensor.

The line-of-sight detection sensor 164 photoelectrically converts the incident reflected infrared light into an electric signal and outputs it to the line-of-sight detection circuit 165. The line-of-sight detection circuit 165 detects the user's viewed position from the movement of the user's eyeball (eye) 161 based on the output signal from the line-of-sight detection sensor 164, and outputs the detection information to the system control unit 50 and a gaze determination unit 170.

A line-of-sight input-setting unit 167 sets whether to enable or disable the line-of-sight detection by the line-of-sight detection circuit 165 (line-of-sight detection unit 160). Alternatively, the line-of-sight input-setting unit 167 sets whether to enable or disable a process of the system control unit 50 by means of a line-of-sight input. For example, the user can enable or disable such process by operating the operation unit 70 on the menu setting.

Based on the detection information received from the line-of-sight detection circuit 165, the gaze determination unit 170 determines that the user gazes at a region when the duration during which the line-of-sight of the user is fixed at the region exceeds a predetermined threshold. As such, this region can be considered as a gaze position (gaze region) that is gazed at. The state in which "a line-of-sight is fixed at a region" refers to a state in which the average position of the movements of the line-of-sight is in this region for a predetermined time period and the variation (dispersion) is less than a predetermined value. The predetermined threshold can be freely changed with the system control unit 50. Additionally, instead of setting the gaze determination unit 170 as an independent block, the system control unit 50 may perform the same function as the gaze determination unit 170 based on the detection information received from the line-of-sight detection circuit 165.

Various setting values of the camera including a shutter speed and a diaphragm aperture are displayed on the out-of-finder display unit 43 via an out-of-finder display unit drive circuit 44.

The non-volatile memory 56 is a memory that is electrically erasable and recordable, such as a Flash-ROM. The non-volatile memory 56 records constants, a program, and other data for the operation of the system control unit 50. The program is used to perform the process of flowcharts of the present embodiment, which will be described below.

The system control unit 50 is a control unit including at least one processor or a circuit and controls the entire digital camera 100. The system control unit 50 performs various processes of the present embodiment, which will be described below, by executing a program recorded in the non-volatile memory 56 described above. A system memory 52 may be a RAM, and the system control unit 50 loads data such as the constants and variables for the operation of the system control unit 50 and a program read from the non-volatile memory 56 in the system memory 52. The system control unit 50 also performs display control by controlling the memory 32 and the display unit 28, for example.

A system timer 53 is a time-measuring unit that measures time used for various controls and the time of the built-in clock.

A power-supply control unit 80 includes components such as a battery-detecting circuit, a DC-DC converter, and a switching circuit for switching between blocks to be energized, and detects whether a battery is mounted, a type of the battery, a remaining battery level, and the like. Additionally, the power-supply control unit 80 controls the DC-DC converter based on detection results thereof and an instruction from the system control unit 50 and supplies respective units, including the recording medium 200, with necessary voltage for a necessary period of time. A power-supply unit 30 may include a primary battery, such as an alkaline battery or a lithium battery, a secondary battery, such as a NiCd battery, a NiMH battery, or a Li battery, or an AC adapter.

A recording medium I/F 18 is an interface with the recording medium 200, which may be a memory card or a hard disk. The recording medium 200 may be a memory card for recording captured images and include a semiconductor memory or a magnetic disk, for example.

A communication unit 54 transmits and receives video signals and audio signals to and from an external device connected wirelessly or by cable. The communication unit 54 can also be connected to a wireless local area network (LAN) and the Internet. Additionally, the communication unit 54 can also communicate with an external device via Bluetooth (registered trademark) or Bluetooth Low Energy. The communication unit 54 can transmit images (including LV images) captured by the imaging unit 22 and images recorded on the recording medium 200, and can receive image data and various other types of information from external devices.

An attitude-detecting unit 55 detects the attitude of the digital camera 100 relative to the direction of gravitational force. Based on the attitude detected by the attitude-detecting unit 55, a determination can be made as to whether an image captured by the imaging unit 22 is an image captured while holding the digital camera 100 horizontally or an image captured while holding the digital camera 100 vertically. The system control unit 50 can add information on the direction corresponding to the attitude detected by the attitude-detecting unit 55 to the image file of the image captured by the imaging unit 22 and record a rotated version of the image. The attitude-detecting unit 55 may be an acceleration sensor or a gyro sensor, for example. A motion of the digital camera 100 (such as pan, tilt, lift, or whether it is stationary) can be detected with the acceleration sensor or the gyro sensor serving as the attitude-detecting unit 55.

An eye-proximity detecting unit 57 is an eye-proximity detecting sensor that detects (approach detection) an approach (eye approach) and a separation (eye separation) of an eye (object) 161 with respect to the eyepiece 16 of the eyepiece finder 17 (hereinafter, simply referred to as a "finder"). The system control unit 50 switches between display (displayed state) and hide (hidden state) of the display unit 28 and the EVF 29 in accordance with the state detected by the eye-proximity detecting unit 57. Specifically, when a current state is at least the image-capturing standby state and the display destination is to be automatically switched, while an eye approach is not detected, the display unit 28 is set as the display destination and its display is turned on, and the EVF 29 is hidden. While an eye approach is detected, the EVF 29 is set as the display destination and its display is turned on, and the display unit 28 is hidden. The eye-proximity detecting unit 57 may be an infrared proximity sensor that is capable of detecting an approach of any object toward the eyepiece 16 of the finder 17 incorporating the EVF 29. When an object approaches, infrared light projected from a light-projecting unit (not shown) of the eye-proximity detecting unit 57 are reflected on the object and received by a light-receiving unit (not shown) of the infrared proximity sensor. It is also possible to determine how close the object is to the eyepiece 16 (eye-proximity distance) based on the amount of infrared light received. In this manner, the eye-proximity detecting unit 57 performs eye-approach detection that detects a distance of approach of an object with respect to the eyepiece 16. In a state in which an eye approach is not detected (non-approach state), an eye approach is detected when an approaching object is detected within a predetermined distance to the eyepiece 16. In a state in which an eye approach is detected (approach state), an eye separation is detected when the object that has been detected in proximity is moved away by at least the predetermined distance. A threshold for detecting an eye approach and a threshold for detecting an eye separation may differ from each other by, for example, setting a hysteresis. After an eye approach is detected, it is assumed that a state in which an eye approach is detected is maintained until an eye separation is detected. After an eye separation is detected, it is assumed that a state in which an eye separation is detected is maintained until an eye approach is detected. An infrared proximity sensor is merely an example, and the eye-proximity detecting unit 57 may be other sensors capable of detecting an approach of an eye or an object that can be considered as an eye approach.

The system control unit 50 is capable of detecting the following operations to the eyepiece 16 and the following states of the eyepiece 16 by controlling the gaze determination unit 170 or the eye-proximity detecting unit 57.

The line-of-sight, which has not been directed at the eyepiece 16, being newly directed at the eyepiece 16. That is, the start of a line-of-sight input.

A state in which a line-of-sight is input to the eyepiece 16.

A state in which the eyepiece 16 is gazed at.

The line-of-sight, which has been directed at the eyepiece 16, being removed. That is, the end of the line-of-sight input.

A state in which no line-of-sight is input to the eyepiece 16.

The system control unit 50 is notified of these operations and states and the position (direction) of the line-of-sight at the eyepiece 16 through an internal bus. Based on the notified information, the system control unit 50 determines what type of operation (line-of-sight operation) has been performed on the eyepiece 16.

An operation unit 70 is an input unit (portion) for accepting an operation by a user (user operation) and is used to input various operation instructions to the system control unit 50. As shown in FIG. 2, the operation unit 70 may include the mode changeover switch 60, the shutter button 61, the power switch 72, and a touch panel 70a. The operation unit 70 also includes, as other operation members 70b, the electronic main dial 71, the electronic sub-dial 73, the four-way key 74, the SET button 75, the moving-image button 76, the AE lock button 77, the enlargement button 78, the playback button 79, and the menu button 81.

The mode changeover switch 60 may switch the operation mode of the system control unit 50 to any of a still-image capturing mode, a moving-image capturing mode, and a playback mode. Modes included in the still-image capturing mode are an automatic capturing mode, an automatic scene determination mode, a manual mode, an aperture priority mode (Av mode), a shutter speed priority mode (Tv mode), and a program AE mode (P mode). Other available modes include various scene modes that constitute image-capturing settings for different image-capturing scenes, and a custom mode. The mode changeover switch 60 allows the user to directly switch to any of these modes. Alternatively, after temporarily switching to a list screen of the image-capturing modes using the mode changeover switch 60, another operation member may be used to selectively switch to any of a plurality of displayed modes. In a similar manner, the moving-image capturing mode may also include a plurality of modes.

The shutter button 61 includes a first shutter switch 62 and a second shutter switch 64. The first shutter switch 62 is turned on during an operation of the shutter button 61 by a half-press (image-capturing preparation instruction) and generates a first shutter switch signal SW1. In response to the first shutter switch signal SW1, the system control unit 50 starts image-capturing preparation operations of autofocus (AF) processing, autoexposure (AE) processing, auto white balance (AWB) processing, pre-flashing (EF) processing, and the like. The second shutter switch 64 is turned on upon completion of an operation of the shutter button 61 by a full-press (image-capturing instruction) and generates a second shutter switch signal SW2. In response to the second shutter switch signal SW2, the system control unit 50 starts a series of operations of an image-capturing process from reading the signal from the imaging unit 22 to writing the captured image into the recording medium 200 as an image file.

The touch panel 70a and the display unit 28 can be integrally configured. For example, the touch panel 70a is configured such that the transmittance of light does not obstruct the display by the display unit 28, and is mounted to the upper layer of the display surface of the display unit 28. Then, input coordinates on the touch panel 70a and display coordinates on the display surface of the display unit 28 are associated with each other. This provides a graphical user interface (GUI) that allows the user to feel as if a screen displayed on the display unit 28 can be directly manipulated. The system control unit 50 is capable of detecting the following operations to the touch panel 70a and the following states of the touch panel 70a.

A new touch on the touch panel 70a by a finger or a stylus previously not in touch with the touch panel 70a or, in other words, a start of a touch (hereinafter referred to as a touch-down)

A state where the touch panel 70a is being touched by a finger or a stylus (hereinafter referred to as a touch-on)

A finger or a stylus moving while in touch with the touch panel 70a (hereinafter referred to as a touch-move)

A separation (release) from the touch panel 70a by a finger or a stylus previously in touch with the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as the position coordinates where a finger or a stylus touches the touch panel 70a through an internal bus. Based on the notified information, the system control unit 50 determines what type of operation (touch operation) has been performed on the touch panel 70a. For a touch-move, a movement direction of a finger or a stylus moving on the touch panel 70a can also be determined for each of a vertical component and a horizontal component on the touch panel 70a based on the change in the position coordinates. When a touch-move of at least a predetermined distance is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of at least a predetermined distance at at least a predetermined speed is followed by a detection of a touch-up. Furthermore, a touch operation involving touching (multi-touching) a plurality of locations (for example, two points) at the same time and bringing the touch positions close to each other is referred to as a pinch-in, while a touch operation in which the touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. The touch panel 70a may use either a system in which a touch is detected when contact is made with the touch panel, or a system in which a touch is detected when a finger or a stylus approaches the touch panel.

Display Control Method

Referring to FIGS. 3A to 3E, a method for controlling the display of the EVF 29 is now described. FIGS. 3A to 3E are diagrams showing examples of states in which a live view image 300 (display object) is displayed on the EVF 29. FIGS. 3A to 3E show that an image of a group of people is displayed as a live view image 300 on the EVF 29.

Figure 3A:
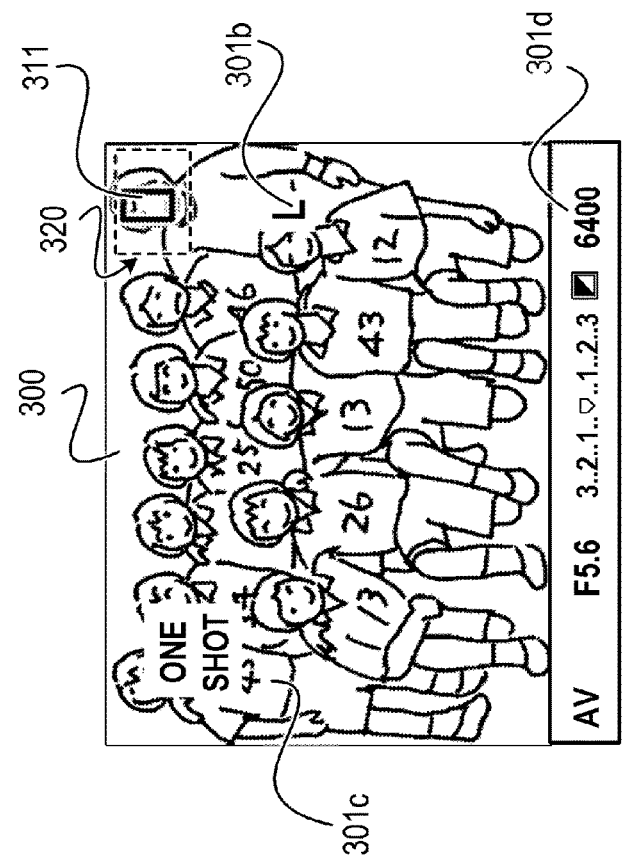
FIGS. 3A to 3E are diagrams showing display examples of display items and an LV image on the EVF.

A plurality of types of display items 301 (such as icons indicating the current image-capturing settings) are displayed on the EVF 29 so that the user can perform setting of the digital camera 100 and an image-capturing operation while looking into the EVF 29. As shown in FIG. 3A, the present embodiment displays, as examples of the display items 301, a sun mark 301a indicating the white balance, an image size 301b of the image to be recorded on the recording medium 200, an autofocus (AF) operation mark 301c, and an ISO sensitivity value 301d.

The display items 301 are displayed in the peripheral section of the live view image 300 or the outside (under) the live view image 300. In the present embodiment, the sun mark 301a, the image size 301b, and the operation mark 301c are displayed in the peripheral section of the live view image 300. The ISO sensitivity value 301d is displayed under (outside) the live view image 300 of the EVF 29.

With respect to the live view image 300, there are three types of regions that are broadly classified. In the example shown in FIG. 3D, the three types of regions are illustrated as rectangular regions enclosed by broken lines. A region in which a display item 301 is superimposed on (displayed in front of) the live view image 300 is defined as a region 320. A region in which only the live view image 300 is displayed is defined as a region 321. The region in which only a display item 301 is displayed is defined as a region 322.

When the viewed position (the position where the user is looking; viewed point) of the user who is looking into the EVF 29 is detected, the digital camera 100 performs a process corresponding to the viewed position. For example, as shown in FIG. 3D, when the user directs his/her line-of-sight to a subject corresponding to the region 321, which is a part of the live view image 300, a focus point 302 (AF frame) for a process of focusing on the subject (focusing process) is displayed as shown in FIG. 3E. Then, when the SET button 75 is pressed, the digital camera 100 selects the focus point 302. Specifically, the digital camera 100 selects the position of the focus point being displayed and sets it as the AF target position.

Referring to FIG. 3D, when the user directs the line-of-sight to the ISO sensitivity value 301d corresponding to the region 322 displayed under the live view image 300, the ISO sensitivity value 301d blinks as shown in FIG. 3E. Then, when the SET button 75 is pressed, the digital camera 100 transitions to an ISO sensitivity setting mode so that the ISO sensitivity value 301d can be changed.

The blinking shown in FIG. 3E is one example of highlighting, and the blinking mark used in FIG. 3E indicates that the display icon or other object located at the center of the mark is blinking. In this manner, when the user directs the line-of-sight to a display item 301, the display item 301 blinks to enable the user to easily notice that the display item 301 is selectable.

When the user directs the line-of-sight to the region 320, since the region 320 displays both a person in the live view image 300 and a display item 301, the digital camera 100 needs to determine which of these is selected by the user. To this end, the digital camera 100 of the present embodiment measures the time in which the user's line-of-sight is fixed (gaze time; duration of a gaze state) and compares the measured time with thresholds of two stages (a first gaze time and a second gaze time). The digital camera 100 thus determines which of the objects of the person and the display item 301 is selected by the user.

Method for Determining User's Selection

Figure 3B:
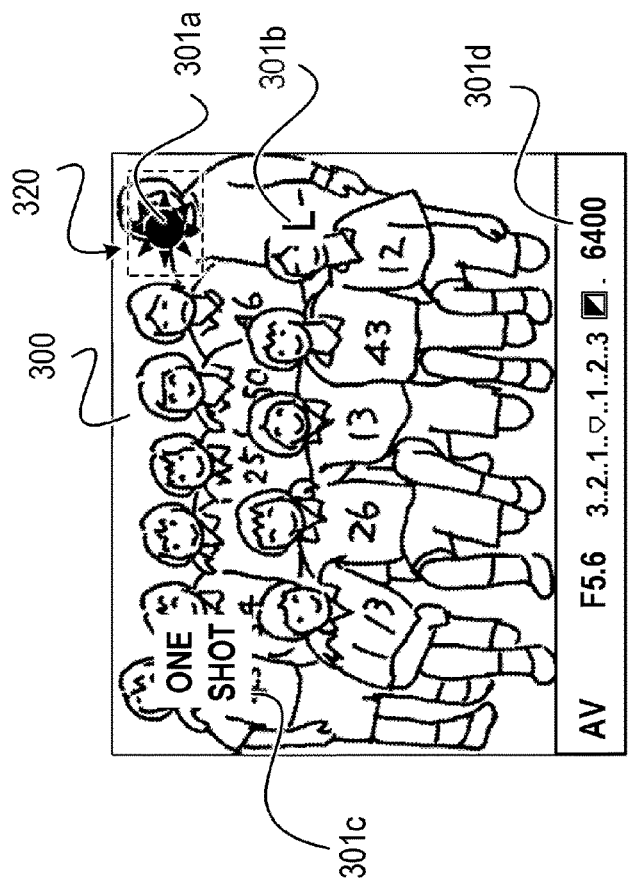
Figure 3D:
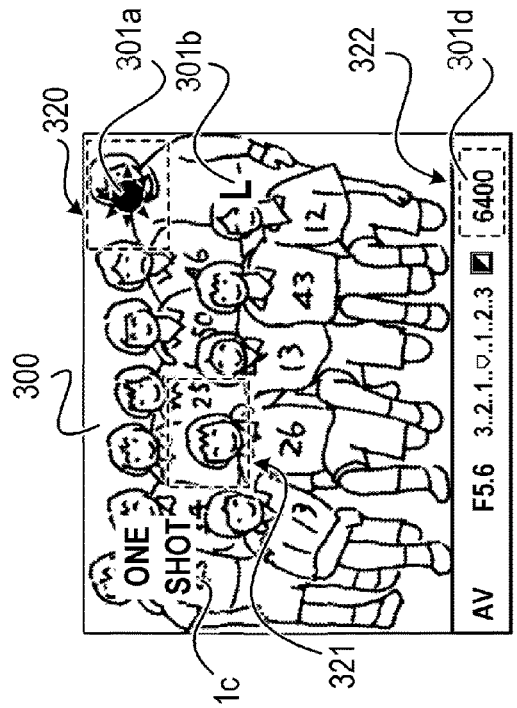
Figure 3C:
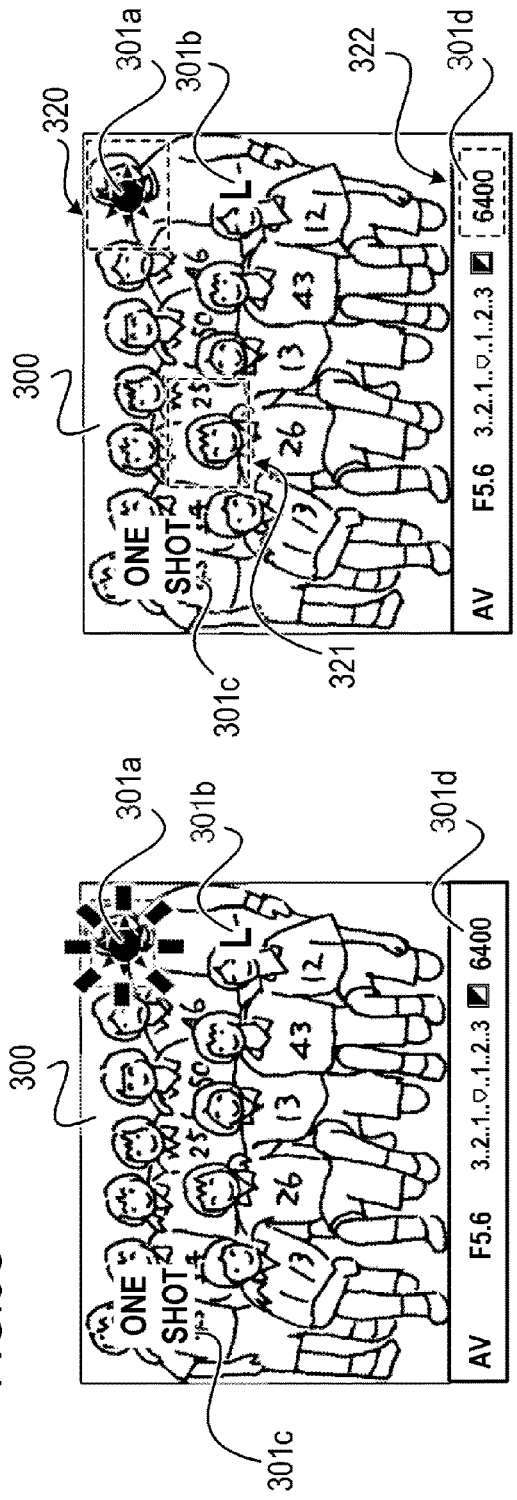
Figure 3E:
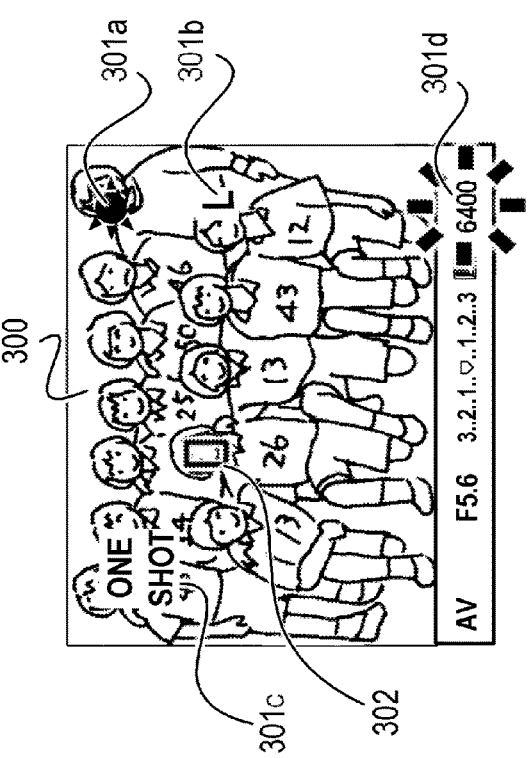

Referring to FIGS. 3A to 3C, a method for determining the user's selection is now described in detail, using an example in which the user gazes at the region 320 in which the sun mark 301a is superimposed on the live view image 300 as shown in FIG. 3A.

As shown in FIG. 3A, when the user gazes at the region 320 and the SET button 75 is pressed (a selection operation is performed) before the first gaze time elapses, the digital camera 100 ignores this pressing operation. That is, the digital camera 100 does not perform any function.

When the user gazes at the region 320 and the first gaze time has elapsed, the digital camera 100 displays a focus point 311 in the region 320 as shown in FIG. 3B. Then, when the SET button 75 is pressed after the first gaze time has elapsed and before the second gaze time elapses, the digital camera 100 determines that the user selects the focus point displayed and performs the process corresponding to this selection.

In this case, as shown in FIG. 3B, the sun mark 301a is hidden when the first gaze time has elapsed. That is, by hiding the sun mark 301a and displaying the focus point 311, the user is notified that "the selection of the focus point is performed when the SET button 75 is pressed after the first gaze time has elapsed and before the second gaze time elapses". As long as the user is notified of the selection of the focus point, the sun mark 301a does not necessarily have to be hidden. For example, the sun mark 301a (icon) may be displayed less prominently, by thinning, reducing, or graying out the character.

On the other hand, when the user gazes at the region 320 and the second gaze time has elapsed, the digital camera 100 blinks the sun mark 301a as shown in FIG. 3C. As long as the user is notified that the sun mark 301a can be selected, the highlighting does not have to be blinking. For example, highlighting may be performed by showing the character in bold, enlarging the mark itself, or coloring the mark. In this case, the focus point is hidden. Then, when the user presses the SET button 75, the digital camera 100 enables the white balance setting to be changed.

As described above, the process desired by the user can be performed by the line-of-sight input according to the gaze time of the user.

Process by Means of User's Line-of-Sight

Figure 4:
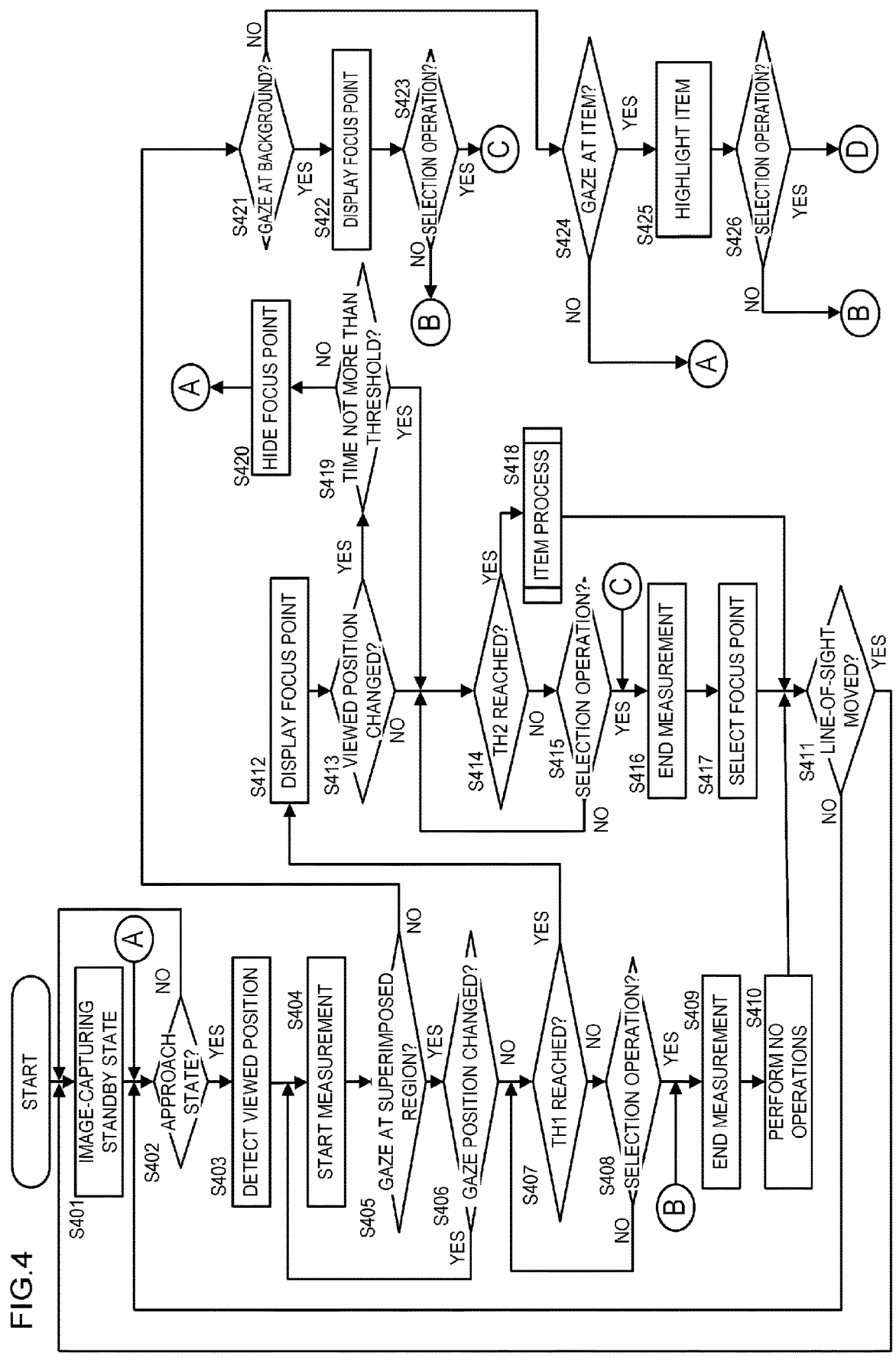
FIG. 4 is a flowchart showing a process according to a line-of-sight of a user.

Referring to the flowchart shown in FIG. 4, the process by means of the user's line-of-sight that is accepted by the line-of-sight detection unit 160 (line-of-sight accepting unit) with respect to a display item 301 and the live view image 300 is now described. The process of this flowchart is performed when a program recorded in the non-volatile memory 56 is loaded into the system memory 52 and executed by the system control unit 50. The process of the flowchart starts when the power switch 72 of the digital camera 100 is turned on. In the following description, the position on the EVF 29 where the user continuously gazes is referred to as a "gaze position", and the momentary viewed position on the EVF 29 (the position where the user is looking, or the input position of the line-of-sight input) is referred to as a "viewed position".

In S401, the system control unit 50 places the digital camera 100 in the image-capturing standby state.

In S402, the system control unit 50 controls the eye-proximity detecting unit 57 to determine whether it is in the approach state. If it is determined that it is in the approach state, the process proceeds to S403. If not, the process returns to S401. The system control unit 50 may also determine that it is in the approach state when the line-of-sight detection sensor 164 detects (accepts) a line-of-sight, for example.

In S403, the system control unit 50 controls the line-of-sight detection circuit 165 to sense (detect) the viewed position on the EVF 29. When the process proceeds to S403, the EVF 29 displays the live view image 300 on which display items 301 as shown in FIG. 3A are superimposed (displayed in the upper layer).

In S404, the system control unit 50 controls the system timer 53 to start measuring the time (gaze time) in which the user gazes at a region (position) of a part of the EVF 29. Here, the term "gaze" refers to a state in which the viewed position (the input position of line-of-sight), which is where the user is looking, is fixed at the region. Even if there is a duration during which the viewed position is moved away from the region, the state in which the region is gazed at (gaze state) is considered to continue when this duration is within the predetermined time.

In S405, the system control unit 50 determines whether the user is gazing at a region in which the live view image 300 and a display item 301 are displayed superimposed over each other (superimposed region). If it is determined that a superimposed region is being gazed at, the process proceeds to S406. If not, the process proceeds to S421.

In S406, the system control unit 50 determines whether the user's gaze position (gaze region) has changed since the measurement of the gaze time was started when the process last proceeded to S404. If it is determined that the gaze position has changed, the process returns to S404. If not, the process proceeds to S407. The determination in S406 on whether the gaze position has changed may be the same process as S413 and S419, which will be described below.

In S407, the system control unit 50 determines whether the gaze time has reached the first set time TH1 (whether the gaze time is at least the first set time TH1). If the gaze time has reached the first set time TH1, the process proceeds to S412. If not (when the gaze time is less than the first set time TH1), the process proceeds to S408.

In S408, the system control unit 50 determines whether a pressing on the SET button 75, which is an operation of selecting the process corresponding to the gaze position (selection operation), has been performed. If it is determined that the SET button 75 is pressed, the process proceeds to S409. If not, the process returns to S407. The selection operation is not limited to a pressing on the SET button 75, and may be an operation on any of the operation members of the operation unit 70. For example, the digital camera 100 may have a voice-input unit for obtaining voice as a part of the operation unit 70, and a selection operation may be predetermined voice that is input to the voice-input unit to instruct a selection. Additionally, a selection operation may be a state corresponding to a closing of the eye of the user. The state corresponding to a closing of the user's eye may be detected by the line-of-sight detection sensor 164 when the viewed position disappears from the live view image 300. Here, the detection of a selection operation by the system control unit 50 serves as a trigger for performing the selection (function) according to the line-of-sight of the user.

In S409, the system control unit 50 ends the measurement of the gaze time with the system timer 53. That is, the system control unit 50 sets (resets) the gaze time to 0, and keeps the gaze time at 0 until the gaze time measurement is started again.

In S410, the system control unit 50 performs no operations. That is, when the SET button 75 is pressed in a state in which the gaze time is shorter than the first set time TH1 (in other words, in a state in which the line-of-sight is not fixed), this pressing is invalid. The present embodiment is not limited to a configuration in which the system control unit 50 performs no operations. For example, the system control unit 50 may perform a certain function that is irrelevant to both the display item 301 and the portion of the live view image 300 corresponding to the gaze position (viewed position). For example, in S410, the system control unit 50 may display a setting screen that allows for the checking of the setting states of a plurality of setting items. Furthermore, the system control unit 50 may capture an image of the subject.

In S411, the system control unit 50 controls the gaze determination unit 170 to determine whether the line-of-sight has moved from the viewed position at the start of the measurement of the gaze time that was started when the process last proceeded to S404. If it is determined that the line-of-sight has not moved, the process proceeds to S401. If not, the process proceeds to S402.

In S412, the system control unit 50 displays a focus point (AF target position) at the gaze position on the live view image 300. At this time, the system control unit 50 changes the display item 301 appearing at the gaze position to less prominent display. Here, changing to less prominent display refers to a state in which a display item 301 is displayed so as to indicate that the display item 301 is not the selection target, by lightening the color of the characters of the display item 301 or making the display item 301 semitransparent, for example. This allows the user to know that the focus point can be selected by pressing the SET button 75 (performing a selection operation).

In S413, the system control unit 50 determines whether the viewed position has changed since the measurement of the gaze time was started when the process last proceeded to S404. If it is determined that the viewed position has changed, the process proceeds to S419. If not, the process proceeds to S414.

In S414, the system control unit 50 determines whether the gaze time has reached the second set time TH2 (whether the gaze time is at least the second set time TH2). The second set time TH2 is longer than the first set time TH1. If it is determined that the gaze time has reached the second set time TH2, the process proceeds to S418. If not (the gaze time is at least the first set time TH1 and less than the second set time TH2), the process proceeds to S415.

In S415, in the same manner as S408, the system control unit 50 determines whether the SET button 75 has been pressed (whether a selection operation has been performed). If it is determined that the SET button 75 has been pressed, the process proceeds to S416. If not, the process proceeds to S414.

In S416, the system control unit 50 ends the measurement of the gaze time with the system timer 53.

In S417, the system control unit 50 selects the focus point being displayed. That is, when the user gazes at a region that is a part of the live view image 300 for a predetermined time and then presses the SET button 75, the system control unit 50 selects this region and sets it as the AF target position. Here, since an image-capturing operation is to be performed after the focus point is selected, the present embodiment is configured such that the focus point is selected after a short gaze time (the first set time TH1). That is, the focus point is given a higher priority. In addition to selecting the focus point, S417 may also perform AF with respect to the focus point, or perform an image-capturing operation.

In S418, the system control unit 50 performs an item process. The item process will be described in detail below with reference to the flowchart of FIG. 5.

In S419, the system control unit 50 determines whether the time elapsed before the viewed position returns to the gaze position at the start of the measurement of the gaze time in S404 after the detection of a change in the viewed position in S413 is not more than a predetermined threshold (within the predetermined threshold). If the time elapsed before the viewed position returns not more than the predetermined threshold, the process proceeds to S414. If not, the process proceeds to S420. Alternatively, the process may proceed to S420 if the time of the predetermined threshold has elapsed after the detection of a change in the viewed position in S413 without the viewed position returning to the gaze position at the start of the measurement of the gaze time in S404. If not, the process may proceed to S414.

When a user gazes at a certain position, fine movements of the line-of-sight (fixational eye movements) occur without conscious control of the user. For this reason, the determination in S419 is performed so that fixational eye movements are not determined as a change in the gaze position. That is, if the viewed position returns to the original gaze position in not more than the predetermined threshold time, the system control unit 50 determines that the change in the viewed position was caused by fixational eye movements and continues the measurement of the gaze time. In contrast, if the viewed position does not return to the original gaze position in not more than the predetermined threshold time, the system control unit 50 determines that the user has intentionally changed the viewed position (the gaze is averted).

In S420, the system control unit 50 hides the focus point displayed in S412. At this time, the system control unit 50 returns the display item 301, which has been displayed less prominently, to normal display (display before S412).

In S421, the system control unit 50 determines whether the user gazes at the live view image 300 (background). If it is determined that the user gazes at the live view image 300, the process proceeds to S422. If not, the process proceeds to S424.

In S422, the system control unit 50 displays the focus point at the gaze position.

In S423, the system control unit 50 determines whether the SET button 75 has been pressed (a selection operation has been performed). If it is determined that the SET button 75 has been pressed, the process proceeds to S416. If not, the process proceeds to S409.

In S424, the system control unit 50 determines whether a display item 301 in a region in which the display item 301 is not superimposed on the live view image 300 (non-superimposed region) is gazed at. If it is determined that a display item 301 in the non-superimposed region is gazed at, the process proceeds to S425. If not, the process returns to S402. If it is determined in S424 that a display item 301 is not gazed at, it can be assumed that the user is not gazing at anything, that is, the line-of-sight is continuously moving.

In S425, the system control unit 50 highlights the display item 301 that is gazed at, as shown in FIG. 3E.

In S426, the system control unit 50 determines whether the SET button 75 has been pressed (whether a selection operation has been performed). If it is determined that the SET button 75 has been pressed, the process proceeds to S507, which will be described below. If not, the process proceeds to S409.

Item Process (Process in S418)

Figure 5:
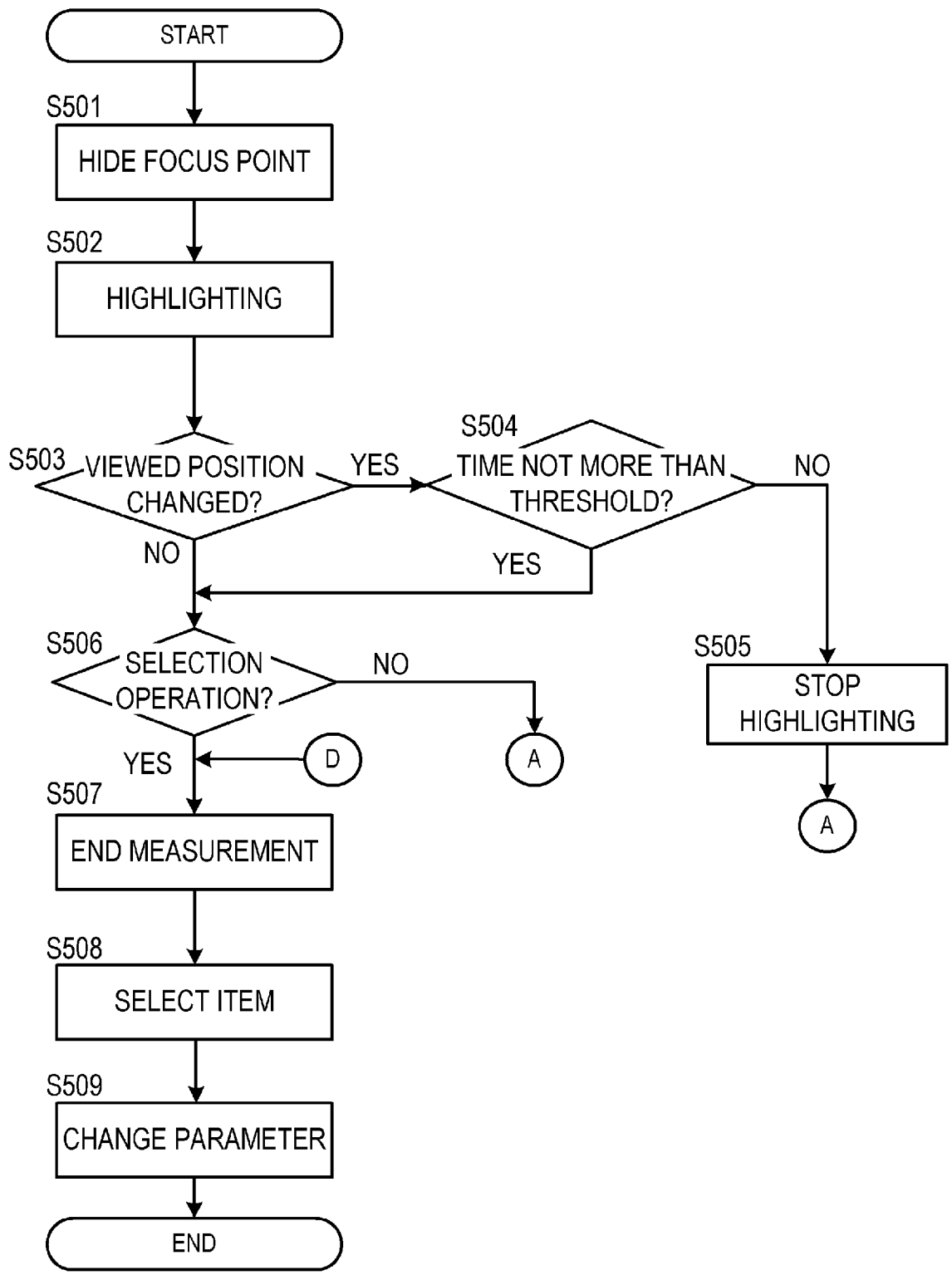
FIG. 5 is a flowchart showing an item process.

The details of the item process performed in S418 are now described with reference to the flowchart of FIG. 5. The process of this flowchart is performed when a program recorded in the non-volatile memory 56 is loaded into the system memory 52 and executed by the system control unit 50.

In S501, the system control unit 50 hides the focus point displayed in S412.

In S502, the system control unit 50 highlights the display item 301 at the gaze position as shown in FIG. 3C. Highlighting the display item 301 enables the user to identify that the display item 301 can be selected by pressing the SET button 75.

In S503, in the same manner as S413, the system control unit 50 determines whether the viewed position has changed since the measurement of the gaze time was started when the process last proceeded to S404. If it is determined that the viewed position has changed, the process proceeds to S504. If not, the process proceeds to S506.

In S504, in the same manner as S419, the system control unit 50 determines whether the time elapsed before the viewed position returns to the gaze position at the start of the measurement of the gaze time in S404 after the detection of a change in the viewed position in S503 is not more than to a predetermined threshold. If the time elapsed before the viewed position returns is not more than the predetermined threshold, the process proceeds to S506. If not, the process proceeds to S505.

In S505, in the same manner as S420, the system control unit 50 hides the focus point. At this time, the system control unit 50 returns the display item 301, which has been displayed less prominently, to normal display. Upon completing S505, the process proceeds to S402.

In S506, the system control unit 50 determines whether the SET button 75 has been pressed (whether a selection operation has been performed). If it is determined that the SET button 75 has been pressed, the process proceeds to S507. If not, the process proceeds to S402.

In S507, the system control unit 50 ends the measurement of the gaze time with the system timer 53.

In S508, the system control unit 50 selects the display item 301 at the gaze position.

In S509, the system control unit 50 changes the parameter of the display item 301 selected in S508. For example, if the display item 301 is the sun mark 301a, the system control unit 50 changes the setting value of white balance. The process of changing a parameter is often performed in advance before an operation of capturing images and thus does not have to be instantaneous. For this reason, the gaze time required to select the parameter is set longer than that for selecting the focus point. That is, the selection of the parameter is given a lower priority. In S509, instead of changing the setting of the parameter itself, the system control unit 50 may display on the EVF 29 a setting change screen for changing the parameter of the display item 301 (transition to the parameter setting state).

If the answer is NO in S408, the process may proceed to S406 since the determination on whether the gaze position (viewed position) has changed is preferably performed continuously during the measurement of the gaze time. Likewise, if the answer is NO in S415, the process may return to S413. Furthermore, if the SET button 75 is not pressed in S506 (NO in S506), the process may return to S503. That is, the steps of S503, S504, and S506 may be repeated until the SET button 75 is pressed or the gaze is averted.

As described above, the operation desired by the user can be performed according to the line-of-sight input of the user even when a display item is superimposed on the display object.

In the present embodiment, the system control unit 50 displays the display item less prominently when the gaze time is at least the first set time, and highlights the display item when the gaze time is at least the second set time. However, the present embodiment is not limited to this, and any configuration may be used as long as the display appearance of a display item in a state in which the gaze time is at least the first set time and less than the second set time is different from the display appearance of the display item in a state in which the gaze time is at least the second set time.

In the example described above, display items are superimposed on the live view image. However, the present embodiment is also applicable to an example in which display items are superimposed on a table, such as an Excel table. In this case, instead of displaying a focus point, the system control unit 50 may highlight the cell at the gaze position in S412 and S422. Additionally, instead of selecting the focus point in S417, the system control unit 50 may select the cell at the gaze position (may select the cell at the gaze position as the position where information is input).

The display item may also be a text box. In this case, in S509, instead of changing the parameter, the system control unit 50 may perform the function of transitioning to a state that enables text (characters) to be input into the text box.

For example, if a display item superimposed on the live view image indicates a clock or a page number, the system control unit 50 does not perform any operations in S508 or S509 even if the superimposed region of this display item is gazed at for at least the second set time. This is because the clock and the page number serve to offer information to the user and are thus less likely to require a selection for some operations.

Furthermore, for a display item that indicates a function such as capturing an image, the system control unit 50 may perform the function corresponding to the display item in response to a selection operation performed after the superimposed region of the display item is gazed at for at least the first set time. In this case, the system control unit 50 does not select the focus point in response to the selection operation unless the superimposed region is gazed at for at least the second set time. This is because the capturing of an image has to be instantaneous and needs to be performed more quickly than the selection of the focus point.

In the example of the present embodiment described above, the live view image and display items are selected. However, the present embodiment is also applicable to a situation in which at least two display items are superimposed. For example, one of two display items may be selected when a selection operation is performed after the superimposed region of the two display items is gazed at for at least the first set time, and the other display item may be selected when a selection operation is performed after the superimposed region is gazed at for at least the second set time.

Further, in the present embodiment, the gaze time required to select the focus point is set shorter than the gaze time required to select the display item, in consideration of the use state of the user. However, the gaze time required to select the display item may be longer.

In S412, instead of displaying a focus point, the image of the gaze position may be enlarged, or the gaze position may be highlighted. In S417, instead of selecting the focus point, the subject may be set (selected) as a tracking target.

According to the above embodiment, the function desired by the user can be performed by means of a line-of-sight of the user even when selectable objects are displayed superimposed over each other.

The various controls that are performed by the system control unit 50 in the foregoing description may be performed by a single piece of hardware. Alternatively, processes may be shared by a plurality of pieces of hardware (e.g., a plurality of processors and circuits) to control the entire device.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The foregoing embodiments are examples in which the present invention is applied to a digital camera 100, but the present invention is not limited to these examples and is applicable to any electronic device that performs a process corresponding to the position of a line-of-sight input. That is, the present invention is applicable to personal computers, PDAs, mobile phones, portable image viewers, printer devices with displays, digital photo frames, music players, game machines, and electronic book readers.

Additionally, the present invention is applicable not only to the main body of an image-capturing device, but also to a controller that communicates with an image-capturing device (including a network camera) wirelessly or by wire and remotely controls the image-capturing device. Examples of devices for remotely controlling an image-capturing device include smartphones, tablet PCs, and desktop PCs. Such a controller can remotely control an image-capturing device by sending commands for various operations and settings to the image-capturing device based on operations and processes performed in the controller. Furthermore, the controller may be configured to receive the live view image captured by the image-capturing device via wired or wireless communication and display the image on the controller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-039169, filed on Mar. 6, 2020, which is hereby incorporated by reference herein in its entirety.

What is claimed is:

1. An electronic device comprising
at least one memory and at least one processor which function as:
a receiving unit configured to receive a line-of-sight input corresponding to a line-of-sight of a user who looks at a display;
a display control unit configured to perform control to display on the display a display object and display a display item superimposed on the display object; and
a control unit configured to perform control such that
1) in a case where a predetermined trigger issued before a duration of a gaze state according to the line-of-sight input relative to a first region, in which the display item is displayed, reaches a first time, neither a first function nor a second function is performed,
2) in a case where the predetermined trigger issued in a state where the duration of the gaze state relative to the first region is at least the first time and less than a second time, a part of the display object based on an input position of the line-of-sight input is selected and the first function is performed, and
3) in a case where the predetermined trigger issued in a state where the duration of the gaze state relative to the first region is at least the second time, the display item is selected and the second function is performed.

2. The electronic device according to claim 1, wherein the display object is a live view image, and
the first function is at least any of autofocus (AF), setting of an AF target position, and setting of a tracking target.

3. The electronic device according to claim 2, wherein the second function is one of setting change of an image-capturing setting corresponding to the display item displayed in the first region, and display of a setting change screen.

4. The electronic device according to claim 1, wherein the display object is a table, and
the first function is selection of a cell of the table.

5. The electronic device according to claim 4, wherein the display item is a text box, and
the second function is transition to a state in which text can be input into the text box displayed in the first region.

6. The electronic device according to claim 1, wherein the gaze state relative to a region is a state in which an input position of the line-of-sight input of the user is fixed at the region, and
in a case where the input position of the line-of-sight input of the user is moved away from the region for a duration that is shorter than or equal to a predetermined threshold, the gaze state is regarded to be continuing.

7. The electronic device according to claim 1, wherein in a case where the predetermined trigger issued before the duration of the gaze state relative to the first region reaches the first time, the control unit does not perform a process corresponding to the predetermined trigger.

8. The electronic device according to claim 1, wherein in a case where the predetermined trigger issued before the duration of the gaze state relative to the first region reaches the first time, the control unit performs a third function.

9. The electronic device according to claim 8, wherein the third function is irrelevant to both the display item and a portion of the display object that corresponds to an input position of the line-of-sight input.

10. The electronic device according to claim 8, wherein the third function is display of a setting screen that allows setting states of a plurality of setting items to be checked.

11. The electronic device according to claim 1, wherein the predetermined trigger is detection of a predetermined operation performed by the user.

12. The electronic device according to claim 1, wherein the predetermined trigger is one of detection of predetermined voice and detection of a state corresponding to a closing of an eye.

13. The electronic device according to claim 1, wherein the display control unit is further configured to control the display such that the display item is arranged in front of the display object.

14. The electronic device according to claim 1, wherein the display control unit is further configured to control the display to
display the display item in a first display appearance before the duration of the gaze state relative to the first region reaches the first time, and in a case where the duration of the gaze state relative to the first region is at least the first time and less than the second time, display the display item in a second display appearance.

15. The electronic device according to claim 1, wherein the display control unit is further configured to control the display to display the display item in a first display appearance before the duration of the gaze state relative to the first region reaches the first time, and in a case where the duration of the gaze state relative to the first region is at least the second time, display the display item in a third display appearance.

16. The electronic device according to claim 1, wherein in a case where the predetermined trigger issued in a state where a duration of the gaze state relative to a second region in which a second display item is displayed superimposed on the display object is at least the second time, the control unit does not perform a function of selecting the second display item.

17. The electronic device according to claim 1, wherein the control unit is further configured to perform control to in a case where the predetermined trigger issued in a state where a duration of the gaze state relative to a third region in which a third display item is displayed superimposed on the display object is at least the first time and less than the second time, perform a function of selecting the third display item, and in a case where the predetermined trigger issued in a state where the duration of the gaze state relative to the third region is at least the second time, select a part of the display object based on an input position of the line-of-sight input and perform the first function.

18. A method for controlling an electronic device, the method comprising:

a step of receiving a line-of-sight input corresponding to a line-of-sight of a user who looks at a display;

a step of performing control to display on the display a display object and display a display item superimposed on the display object; and a step of performing control such that 1) in a case where a predetermined trigger issued before a duration of a gaze state according to the line-of-sight input relative to a first region, in which the display item is displayed, reaches a first time, neither a first function nor a second function is performed, 2) in a case where to the predetermined trigger issued in a state where the duration of the gaze state relative to the first region is at least the first time and less than a second time, a part of the display object based on an input position of the line-of-sight input is selected and the first function is performed, and 3) in a case where the predetermined trigger issued in a state where the duration of the gaze state relative to the first region is at least the second time, the display item is selected and the second function is performed.

19. A non-transitory computer-readable storage medium storing a computer program for causing a computer to execute a method for controlling an electronic device, the method comprising:

a step of receiving a line-of-sight input corresponding to a line-of-sight of a user who looks at a display;

a step of performing control to display on the display a display object and display a display item superimposed on the display object; and a step of performing control such that 1) in a case where a predetermined trigger issued before a duration of a gaze state according to the line-of-sight input relative to a first region, in which the display item is displayed, reaches a first time, neither a first function nor a second function is performed, 2) in a case where to the predetermined trigger issued in a state where the duration of the gaze state relative to the first region is at least the first time and less than a second time, a part of the display object based on an input position of the line-of-sight input is selected and the first function is performed, and 3) in a case where the predetermined trigger issued in a state where the duration of the gaze state relative to the first region is at least the second time, the display item is selected and the second function is performed.

\* \* \* \* \*